(12) United States Patent
Lee et al.

(10) Patent No.: US 9,768,471 B2
(45) Date of Patent: Sep. 19, 2017

(54) RECHARGEABLE LITHIUM BATTERY

(71) Applicant: SAMSUNG SDI CO., LTD., Yongin-si, Gyeonggi-do (KR)

(72) Inventors: In-Hyun Lee, Yongin-si (KR); Su-Jin Yoon, Yongin-si (KR); Tae-Ahn Kim, Yongin-si (KR); Seung-Ju Oh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 88 days.

(21) Appl. No.: 14/630,603

(22) Filed: Feb. 24, 2015

(65) Prior Publication Data

US 2015/0288033 A1    Oct. 8, 2015

(30) Foreign Application Priority Data

Apr. 7, 2014 (KR) ........................ 10-2014-0041457

(51) Int. Cl.
| | |
|---|---|
| *H01M 10/0567* | (2010.01) |
| *H01M 10/0569* | (2010.01) |
| *H01M 10/052* | (2010.01) |
| *H01M 10/0568* | (2010.01) |
| *H01M 4/505* | (2010.01) |
| *H01M 4/525* | (2010.01) |
| *H01M 4/02* | (2006.01) |

(52) U.S. Cl.
CPC ....... *H01M 10/0569* (2013.01); *H01M 4/505* (2013.01); *H01M 4/525* (2013.01); *H01M 10/052* (2013.01); *H01M 10/0567* (2013.01); *H01M 10/0568* (2013.01); *H01M 2004/028* (2013.01); *H01M 2300/0028* (2013.01); *H01M 2300/0037* (2013.01); *Y02E 60/122* (2013.01); *Y02T 10/7011* (2013.01)

(58) Field of Classification Search
CPC ......... H01M 10/0567; H01M 10/0569; H01M 10/0568; H01M 10/052; H01M 4/505; H01M 4/525; H01M 2004/028; H01M 2300/0028; H01M 2300/0037; Y02E 60/122

See application file for complete search history.

(56) References Cited

U.S. PATENT DOCUMENTS

| | | | |
|---|---|---|---|
| 8,728,657 B2 | 5/2014 | Tsujioka et al. | |
| 2009/0286155 A1 | 11/2009 | Takehara | |
| 2013/0330610 A1* | 12/2013 | Shigematsu | ...... H01M 10/0567 429/200 |

FOREIGN PATENT DOCUMENTS

| | | |
|---|---|---|
| JP | 2011-124123 A | 6/2011 |
| JP | 2011-134547 A | 7/2011 |
| KR | 10-2009-0042979 A | 5/2009 |
| KR | 10-2009-0118117 A | 11/2009 |

OTHER PUBLICATIONS

Machine English Translation of JP 2011-124123 A, published Jun. 23, 2011, 74 pages.
Machine English Translation of JP 2011-134547 A, published Jul. 7, 2011, 17 pages.

\* cited by examiner

*Primary Examiner* — Laura Weiner
(74) *Attorney, Agent, or Firm* — Lewis Roca Rothgerber Christie LLP

(57) ABSTRACT

A rechargeable lithium battery includes a positive electrode including a positive active material, a negative electrode and an electrolyte including a lithium salt, an organic solvent and an additive. The positive active material includes a compound represented by Chemical Formula 1, and the additive includes about 0.5 to about 2 parts by weight of lithium difluorophosphate ($LiPO_2F_2$) and about 0.5 to about 3 parts by weight of vinylene carbonate, based on 100 parts by weight of the organic solvent.

$Li_aNi_xCo_yMn_zO_2$      Chemical Formula 1.

7 Claims, 1 Drawing Sheet

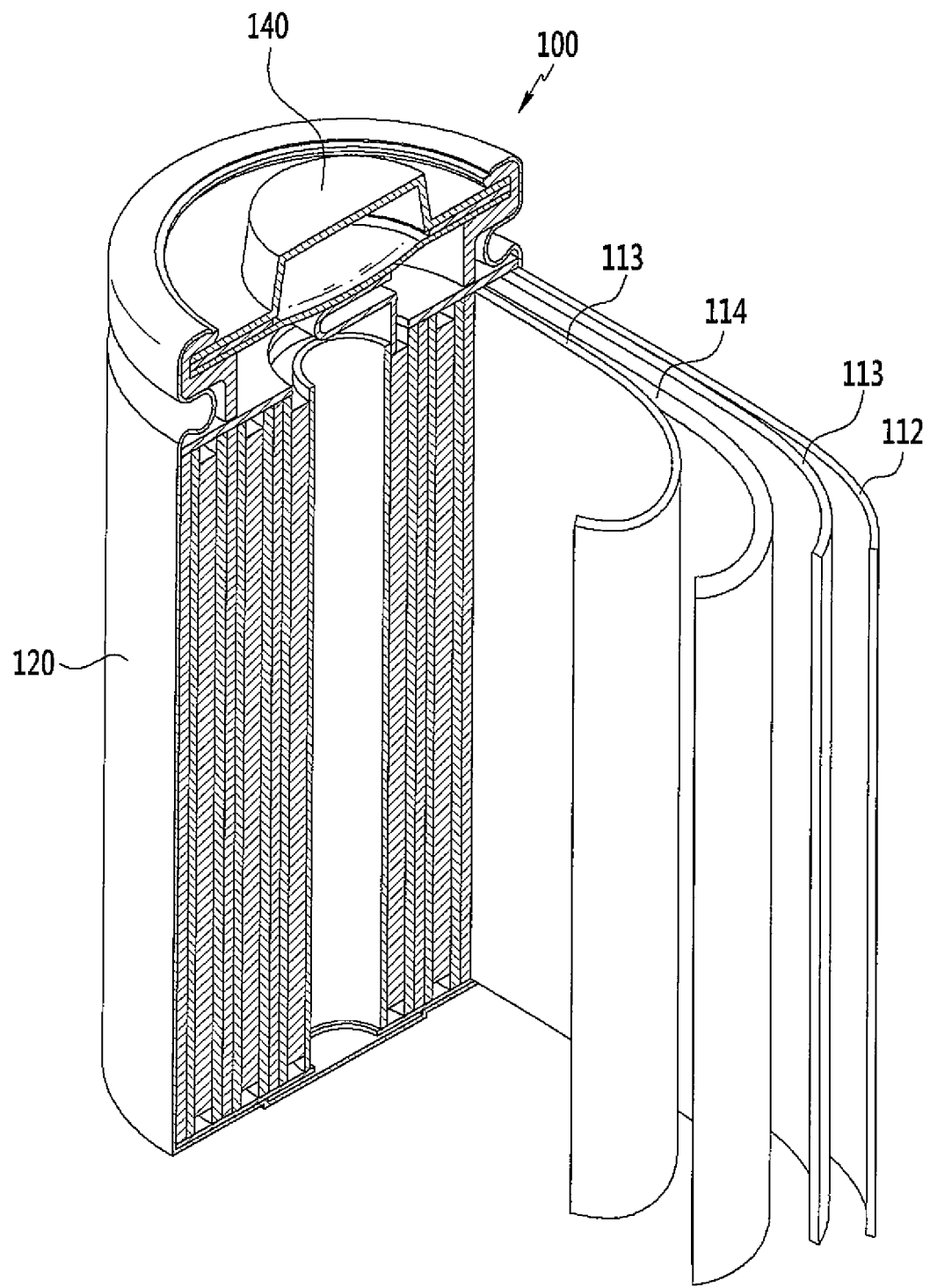

RECHARGEABLE LITHIUM BATTERY

CROSS-REFERENCE TO RELATED APPLICATION

This application claims priority to and the benefit of Korean Patent Application No. 10-2014-0041457 filed in the Korean Intellectual Property Office on Apr. 7, 2014, the entire content of which is incorporated herein by reference.

BACKGROUND

1. Field

A rechargeable lithium battery is disclosed.

2. Description of the Related Art

Wide use of battery-operated electronic devices, such as mobile phones, camcorders, laptop computers and electric cars, has created a demand for high energy density batteries as power sources for these devices.

A rechargeable lithium battery typically includes a negative electrode including a carbonaceous material capable of absorbing and releasing (intercalating/deintercalating) lithium ions, a positive electrode including a lithium-containing oxide, and/or the like, and an electrolyte including a lithium salt dissolved in an organic solvent. During the initial charge of a rechargeable lithium battery, lithium ions are released from a positive active material, such as, for example, a lithium-transition metal oxide, and are transferred to a negative active material such as, for example, graphite, where the ions are intercalated into the negative active material.

Due to the high reactivity of lithium, the lithium salt in the electrolyte can react on the surface of the negative active material and a compound such as $Li_2CO_3$, $Li_2O$, $LiOH$, and/or the like may be produced. These compounds may form a SEI (solid electrolyte interface) film on the surface of the negative active material, and the SEI film may act as an ion tunnel, allowing for the passage of lithium ions.

Through this ion tunnel effect, the SEI film prevents (or reduces) damage to the structure of the negative electrode, which can be caused by co-intercalation of high molecular weight organic solvents, along with solvated lithium ions, into the interlayers of the negative active material.

In addition, the SEI film prevents (or reduces) contact between the electrolyte and the negative active material, thereby preventing (or reducing) decomposition of the electrolyte. Accordingly, the lithium ion content of the electrolyte is reversibly maintained, and stable charge and discharge characteristics may be realized.

However, the SEI film is not thermally stable and can be damaged or destroyed by increased electrochemical energy and thermal energy resulting from operation of the battery or from allowing the battery to stand at a high temperature. If the SEI film is destroyed and the negative electrode is left without a protection layer, cycle-life characteristics and performance of the battery may deteriorate.

SUMMARY

One embodiment of the present disclosure provides for a rechargeable lithium battery having high capacity, and good cycle-life and power characteristics at room temperature and at high temperatures.

One embodiment provides for a rechargeable lithium battery that includes a positive electrode including a positive active material, a negative electrode, and an electrolyte. The electrolyte includes a lithium salt, an organic solvent and an additive. The positive active material includes a compound represented by the following Chemical Formula 1, and the additive includes about 0.5 parts by weight to about 2 parts by weight of lithium difluorophosphate ($LiPO_2F_2$) and about 0.5 parts by weight to about 3 parts by weight of vinylene carbonate, both based on 100 parts by weight of the organic solvent.

$$Li_aNi_xCo_yMn_zO_2 \quad \text{Chemical Formula 1}$$

In the above Chemical Formula 1,
$0<a\leq2$, $0.2\leq x\leq0.6$, $0.2\leq y\leq0.6$, $0.2<z\leq0.6$, and $x+y+z=1$.

The positive active material may further include a compound represented by the following Chemical Formula 2.

$$LiMnO_2 \quad \text{Chemical Formula 2}$$

The positive active material may include about 80 wt % to about 99 wt % of the compound represented by the above Chemical Formula 1 and about 1 wt % to about 20 wt % of the compound represented by the above Chemical Formula 2.

The lithium difluorophosphate may be included in the additive in an amount of about 1 part by weight to about 1.5 parts by weight based on 100 parts by weight of the organic solvent.

The vinylene carbonate may be included in the additive in an amount of about 0.5 parts by weight to about 1 part by weight based on 100 parts by weight of the organic solvent.

A weight ratio of the vinylene carbonate to the lithium difluorophosphate may be about 1:2 to about 3:1.

The lithium salt may include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, where x and y are natural numbers, LiCl, LiI, $LiB(C_2O_4)_2$ (lithium bis(oxalato) borate, LiBOB), or a combination thereof.

The organic solvent may include ethylene carbonate, propylene carbonate, butylene carbonate, dimethyl carbonate, diethyl carbonate, dipropyl carbonate, methylpropyl carbonate, ethylpropyl carbonate, methylethyl carbonate, ethylacetate, methylacetate, n-propylacetate, dimethylsulfoxide, acetonitrile, dimethoxyethane, diethoxyethane, sulfolane, gamma-butyrolactone, ethylene sulfite, propylene sulfite, tetrahydrofuran, methyl propionate, ethyl propionate, propyl propionate, decanolide, valerolactone, mevalonolactone, caprolactone, dibutylether, tetraglyme, diglyme, 2-methyltetrahydrofuran, cyclohexanone, ethanol, isopropyl alcohol, or a combination thereof.

The additive may further include vinylethylene carbonate, fluoroethylene carbonate, or a combination thereof.

Other embodiments are included in the following detailed description.

A rechargeable lithium battery having high capacity, and good cycle-life and output characteristics at room temperature and at high temperature may be realized according to embodiments of the present invention.

BRIEF DESCRIPTION OF THE DRAWING

The drawing is a cross-sectional perspective view showing a rechargeable lithium battery according to one embodiment.

DETAILED DESCRIPTION

Hereinafter, some exemplary embodiments are described. However, these embodiments are exemplary, and this disclosure is not limited thereto. As those skilled in the art would realize, the described embodiments may be modified in various different ways, all without departing from the spirit or scope of the present invention. Accordingly, the drawings and description are to be regarded as illustrative in nature and not restrictive. Expressions such as "at least one of" and "one of," when preceding a list of elements, modify the entire list of elements and do not modify the individual elements of the list. Further, the use of "may" when describing embodiments of the present invention refers to "one or more embodiments of the present invention."

The drawing is a cross-sectional perspective view of a rechargeable lithium battery according to one embodiment.

Referring to the drawing, a rechargeable lithium battery 100 according to one embodiment includes an electrode assembly including a positive electrode 114, a negative electrode 112 facing the positive electrode 114, a separator 113 between the positive electrode 114 and the negative electrode 112, and an electrolyte (not shown) impregnated in the positive electrode 114, the negative electrode 112, and the separator 113. The rechargeable lithium battery 100 further includes a battery case 120 housing the electrode assembly, and a sealing member 140 sealing the battery case 120.

The positive electrode includes a current collector and a positive active material layer on the current collector. The positive active material layer includes a positive active material, a binder, and, optionally, a conductive material.

The current collector may be Al (aluminum), but is not limited thereto.

The positive active material may include a compound represented by the following Chemical Formula 1. When the positive active material includes the compound represented by the following Chemical Formula 1, a high-capacity rechargeable lithium battery may be realized.

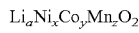
$Li_aNi_xCo_yMn_zO_2$  Chemical Formula 1

In the above Chemical Formula 1,
$0<a\leq2$, $0.2\leq x\leq0.6$, $0.2\leq y\leq0.6$, $0.2<z\leq0.6$, and $x+y+z=1$.

According to one embodiment, the positive active material may include the compound represented by the above Chemical Formula 1 and a compound represented by the following Chemical Formula 2. When the positive active material includes a compound of Chemical Formula 1 mixed with a compound of Chemical Formula 2, both high capacity and good output characteristics may be realized.

$LiMnO_2$  Chemical Formula 2

When a compound represented by the above Chemical Formula 1 is mixed with a compound represented by the above Chemical Formula 2, about 80 wt % to about 99 wt % of the compound represented by the above Chemical Formula 1 and about 1 wt % to about 20 wt % of the compound represented by the above Chemical Formula 2 may be used, and in some embodiments about 85 wt % to about 95 wt % of the compound represented by the above Chemical Formula 1 and about 5 wt % to about 15 wt % of the compound represented by the above Chemical Formula 2 may be used. When the two compounds are mixed within these ranges, good power characteristics may be obtained without a substantial increase in resistance. Furthermore, this effect can be achieved even when the battery is allowed to stand at high temperatures. In other words, the positive active material including the compound of Chemical Formula 1 and the compound of Chemical Formula 2 within the above-described composition range may realize a rechargeable lithium battery having both high capacity and good output characteristics.

In one embodiment, the binder improves the binding properties of the positive active material particles with one another and with the current collector. Non-limiting examples of the binder include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like.

In one embodiment, the conductive material improves the conductivity of the electrode. Any suitable electrically conductive material may be used as the conductive material, so long as it does not cause a chemical change in the battery. Non-limiting examples of the conductive material include one or more of natural graphite, artificial graphite, carbon black, acetylene black, ketjen black, a carbon fiber; a metal powder, a metal fiber, and/or the like of copper, nickel, aluminum, silver, and/or the like; a conductive material, such as a polyphenylene derivative and/or the like.

The negative electrode includes a current collector and a negative active material layer on the current collector.

The current collector may include a copper foil, a nickel foil, a stainless steel foil, a titanium foil, a nickel foam, a copper foam, a polymer substrate coated with a conductive metal, or a combination thereof, but is not limited thereto.

The negative active material layer includes a negative active material, a binder and, optionally, a conductive material.

The negative active material may include a material capable of reversibly intercalating/deintercalating lithium ions, a lithium metal, a lithium metal alloy, a material capable of doping and dedoping lithium, or a transition metal oxide.

The material that is capable of intercalating/deintercalating lithium ions may be any carbon-based negative active material suitable for use in a rechargeable lithium ion battery, and non-limiting examples thereof include crystalline carbon, amorphous carbon, or a combination thereof. Non-limiting examples of the crystalline carbon include a graphite such as shapeless, sheet-shaped, flake-shaped, spherically-shaped or fiber-shaped natural graphite or artificial graphite, and non-limiting examples of the amorphous carbon include soft carbon or hard carbon, a mesophase pitch carbonized product, fired cokes, and/or the like.

The lithium metal alloy may include an alloy of lithium and at least one metal selected from Na, K, Rb, Cs, Fr, Be, Mg, Ca, Sr, Si, Sb, Pb, In, Zn, Ba, Ra, Ge, Al, and/or Sn.

The material capable of doping and dedoping lithium may be Si, $SiO_x$ ($0<x<2$), a Si—C composite, a Si—Y alloy (where Y is an alkali metal, an alkaline-earth metal, a Group 13 to 16 element, a transition metal, a rare earth element, or a combination thereof, but Y is not Si), Sn, $SnO_2$, a Sn—C composite, Sn—Y (where Y is an alkali metal, an alkaline-earth metal, a Group 13 to 16 element, a transition metal, a rare earth element, or a combination thereof, but Y is not Sn), and/or the like. At least one of the above-described compounds may be mixed with $SiO_2$. Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may be vanadium oxide, lithium vanadium oxide, and/or the like, but the transition metal oxide is not limited thereto.

In one embodiment, the binder improves the binding properties of the negative active material particles with one another and with the current collector. Non-limiting examples of the binder include polyvinyl alcohol, carboxymethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like.

In one embodiment, the conductive material improves the conductivity of the electrode. Any suitable electrically conductive material may be used as the conductive material, so long as it does not cause a chemical change in the battery. Non-limiting examples of the conductive material include a carbon-based material such as natural graphite, artificial graphite, carbon black, acetylene black, ketjen black, a carbon fiber and/or the like; a metal-based material such as a metal powder or a metal fiber and/or the like of copper, nickel, aluminum, silver, and/or the like; a conductive polymer, such as a polyphenylene derivative and/or the like; or a mixture thereof.

The negative electrode and the positive electrode may each be manufactured by mixing the active material, the conductive material, and the binder in a solvent to prepare an active material composition, and coating the active material composition on the current collector.

The electrode manufacturing method should be apparent to those of ordinary skill in the art. In one embodiment, the solvent includes N-methylpyrrolidone and/or the like, but the solvent is not limited thereto.

In one embodiment, the electrolyte includes a lithium salt, an organic solvent and an additive.

The additive may include lithium difluorophosphate ($LiPO_2F_2$) and vinylene carbonate.

When a rechargeable lithium battery includes the positive active material described above, but does not include both lithium difluorophosphate ($LiPO_2F_2$) and vinylene carbonate as the electrolyte additive, some characteristics of the battery may be unsatisfactory. For example, when the above-described positive active material is used, and only lithium difluorophosphate is included as the additive, the rechargeable lithium battery may have good power characteristics, but unsatisfactory cycle-life characteristics, especially if the battery is allowed to stand at high temperatures. Similarly, when the above-described positive active material is used, and only vinylene carbonate is used as the additive, the rechargeable lithium battery may have good cycle-life characteristics, but unsatisfactory power characteristics and high temperature cycle-life characteristics.

According to one embodiment, when a mixture of lithium difluorophosphate and vinylene carbonate is included in the electrolyte additive, and the compounds represented by the above Chemical Formulae 1 and 2 are included in the positive active material, the resulting rechargeable lithium battery shows no (or reduced) resistance increase when allowed to stand at a high temperature. Accordingly, when the positive electrode and the electrolyte according to embodiments of the present invention are used (utilized), the resulting rechargeable lithium battery may have good cycle-life characteristics and power characteristics, as well as good cycle-life characteristics when allowed to stand at a high temperature.

Lithium difluorophosphate may be included in the additive in an amount of about 1 part by weight to about 1.5 parts by weight, and in some embodiments about 0.5 parts by weight to about 1.5 parts by weight, or about 1 part by weight to about 2 parts by weight, based on 100 parts by weight of the organic solvent. Vinylene carbonate may be included in an amount of about 0.5 parts by weight to about 3 parts by weight, and in some embodiments about 0.5 parts by weight to about 1 part by weight, based on 100parts by weight of the organic solvent. In some embodiments, the vinylene carbonate and lithium difluorophosphate may be mixed in a weight ratio of about 1:2 to about 3:1, and in some embodiments about 1:2 to about 2:1. When the lithium difluorophosphate and vinylene carbonate are respectively included within one of the above-described ranges and/or within one of the mixing ratio ranges, the resulting rechargeable lithium battery may have good cycle-life characteristics and power characteristics, as well as good cycle-life characteristics when allowed to stand at a high temperature.

The additive may be prepared by further mixing vinylethylene carbonate, fluoroethylene carbonate, or a combination thereof, with the compounds described above.

In one embodiment, the lithium salt is dissolved in an organic solvent and supplies the lithium ions in the battery, thereby facilitating the basic operation of the rechargeable lithium battery, and improving lithium ion transportation between the positive and negative electrodes.

The lithium salt may include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ where x and y are natural numbers, e.g., an integer of 1 to 20, LiCl, LiI, $LiB(C_2O_4)_2$ (lithium bis(oxalato) borate, LiBOB), or a combination thereof, but the lithium salt is not limited thereto.

The lithium salt may be present in a concentration of about 0.1 M to about 2.0 M. When the lithium salt is included within the above concentration range, the electrolyte may have good performance and lithium ion mobility due to good electrolyte conductivity and viscosity.

In one embodiment, the organic solvent serves as a medium for transmitting ions taking part in the electrochemical reaction of the battery.

Non-limiting examples of the organic solvent include ethylene carbonate, propylene carbonate, butylene carbonate, dimethyl carbonate, diethyl carbonate, dipropyl carbonate, methylpropyl carbonate, ethylpropyl carbonate, methylethyl carbonate, acetate, methylacetate, n-propylacetate, dimethylsulfoxide, acetonitrile, dimethoxyethane, diethoxyethane, sulfolane, gamma-butyrolactone, ethylene sulfite, propylene sulfite, tetrahydrofuran, methyl propionate, ethyl propionate, propyl propionate, decanolide, valerolactone, mevalonolactone, caprolactone, dibutylether, tetraglyme, diglyme, 2-methyltetrahydrofuran, cyclohexanone, ethanol, isopropyl alcohol, or a combination thereof.

When the organic solvent includes a mixture of solvents, the mixing ratio of the mixture may be controlled in accordance with the desired (or suitable) battery performance.

The separator may include any material suitable for use in a lithium battery, as long as the material is capable of separating the negative electrode from the positive electrode and providing passage for the transport of lithium ions. In other words, the separator may have low resistance to ion transport and good impregnation capacity for the electrolyte. Non-limiting examples of the separator include a glass fiber, polyester, polyethylene, polypropylene, polytetrafluoroethylene (PTFE), or a combination thereof. The separator may be a non-woven fabric or a woven fabric. In one embodiment, a polyolefin-based polymer separator such as polyethylene, polypropylene and/or the like may be used for a lithium ion battery. In order to facilitate the desired (or suitable) heat resistance and/or mechanical strength, a coated separator including a ceramic component or a polymer material may be used. The coated separator may have a mono-layered or a multi-layered structure.

Hereinafter, embodiments are illustrated with reference to certain examples. However, these examples are provided for illustrative purposes only, and should not in any sense be interpreted as limiting the scope of the present disclosure.

Manufacture of Rechargeable Lithium Battery Cell

EXAMPLE 1

A mixture of 90 wt % of $LiNi_{0.5}Co_{0.2}Mn_{0.3}O_2$ and 10 wt % of $LiMnO_2$ as a positive active material, polyvinylidene fluoride (PVDF) as a binder and carbon black as a conductive material were mixed in a weight ratio of 92:4:4, respectively, and the resulting mixture was dispersed in N-methyl-2-pyrrolidone, thus preparing a positive active material layer composition. The positive active material layer composition was coated on a 20 μm-thick aluminum foil, and then dried and compressed, thus manufacturing a positive electrode.

The resulting positive electrode and metal lithium as its counter electrode were used to manufacture a coin-type half-cell.

An electrolyte was prepared by dissolving 1.15 M $LiPF_6$ in an organic solvent prepared by mixing ethylene carbonate (EC), ethylmethyl carbonate (EMC), and dimethyl carbonate (DMC) in a volume ratio of 3:4:3, and adding 1 part by weight of $LiPO_2F_2$ and 0.5 parts by weight of vinylene carbonate, based on 100 parts by weight of the organic solvent.

EXAMPLE 2

A half-cell was manufactured as in Example 1 except that a mixture of 80 wt % of $LiNi_{0.5}Co_{0.2}Mn_{0.3}O_2$ and 20 wt % of $LiMnO_2$ was used as the positive active material.

EXAMPLE 3

A half-cell was manufactured as in Example 1 except that 100 wt % of $LiNi_{0.5}Co_{0.2}Mn_{0.3}O_2$ was used as the positive active material.

EXAMPLE 4

A half-cell was manufactured as in Example 1 except that 1 part by weight of $LiPO_2F_2$ and 1 part by weight of vinylene carbonate, based on 100 parts by weight of the organic solvent, was used to prepare the electrolyte.

EXAMPLE 5

A half-cell was manufactured as in Example 1 except that 1 part by weight of $LiPO_2F_2$ and 3 parts by weight of vinylene carbonate, based on 100 parts by weight of the organic solvent, was used to prepare the electrolyte.

Comparative EXAMPLE 1

A half-cell was manufactured as in Example 1 except that only 1 part by weight of $LiPO_2F_2$, based on 100 parts by weight of the organic solvent, was added to prepare the electrolyte, and no vinylene carbonate was added.

COMPARATIVE EXAMPLE 2

A half-cell was manufactured as in Example 1 except that only 0.5 parts by weight of vinylene carbonate, based on 100 parts by weight of the organic solvent, was added to prepare the electrolyte, and no $LiPO_2F_2$ was added.

Comparative Example 3

A half-cell was manufactured as in Example 1 except that 0.5 parts by weight of $LiPO_2F_2$ and 4 parts by weight of vinylene carbonate, based on 100 parts by weight of the organic solvent, was used to prepare the electrolyte.

Comparative Example 4

A half-cell was manufactured as in Example 1 except that 3 parts by weight of $LiPO_2F_2$ and 0.3 parts by weight of vinylene carbonate, based on 100 parts by weight of the organic solvent, was used to prepare the electrolyte.

Reference Example 1

A half-cell was manufactured as in Example 1 except that a mixture of 50 wt % of $LiNi_{0.5}Co_{0.2}Mn_{0.3}O_2$ and 50 wt % of $LiMnO_2$ was used as the positive active material.

Reference Example 2

A half-cell was manufactured as in Example 1 except that a mixture of 40 wt % of $LiNi_{0.5}Co_{0.2}Mn_{0.3}O_2$ and 60 wt % of $LiMnO_2$ was used as the positive active material.

TABLE 1

| | Composition of positive active material | Composition of electrolyte additive (based on 100 parts by weight of the organic solvent) |
|---|---|---|
| Example 1 | 90 wt % of $LiNi_{0.5}Co_{0.2}Mn_{0.3}O_2$ and 10 wt % of $LiMnO_2$ | 1 part by weight of $LiPO_2F_2$ and 0.5 parts by weight of vinylene carbonate |
| Example 2 | 80 wt % of $LiNi_{0.5}Co_{0.2}Mn_{0.3}O_2$ and 20 wt % of $LiMnO_2$ | 1 part by weight of $LiPO_2F_2$ and 0.5 parts by weight of vinylene carbonate |
| Example 3 | 100 wt % of $LiNi_{0.5}Co_{0.2}Mn_{0.3}O_2$ | 1 part by weight of $LiPO_2F_2$ and 0.5 parts by weight of vinylene carbonate |
| Example 4 | 90 wt % of $LiNi_{0.5}Co_{0.2}Mn_{0.3}O_2$ and 10 wt % of $LiMnO_2$ | 1 part by weight of $LiPO_2F_2$ and 1 part by weight of vinylene carbonate |
| Example 5 | 90 wt % of $LiNi_{0.5}Co_{0.2}Mn_{0.3}O_2$ and 10 wt % of $LiMnO_2$ | 1 part by weight of $LiPO_2F_2$ and 3 parts by weight of vinylene carbonate |
| Comparative Example 1 | 90 wt % of $LiNi_{0.5}Co_{0.2}Mn_{0.3}O_2$ and 10 wt % of $LiMnO_2$ | 1 part by weight of $LiPO_2F_2$ |
| Comparative Example 2 | 90 wt % of $LiNi_{0.5}Co_{0.2}Mn_{0.3}O_2$ and 10 wt % of $LiMnO_2$ | 0.5 parts by weight of vinylene carbonate |
| Comparative Example 3 | 90 wt % of $LiNi_{0.5}Co_{0.2}Mn_{0.3}O_2$ and 10 wt % of $LiMnO_2$ | 0.5 parts by weight of $LiPO_2F_2$ and 4 parts by weight of vinylene carbonate |
| Comparative Example 4 | 90 wt % of $LiNi_{0.5}Co_{0.2}Mn_{0.3}O_2$ and 10 wt % of $LiMnO_2$ | 3 parts by weight of $LiPO_2F_2$ and 0.3 parts by weight of vinylene carbonate |
| Reference Example 1 | 50 wt % of $LiNi_{0.5}Co_{0.2}Mn_{0.3}O_2$ and 50 wt % of $LiMnO_2$ | 1 part by weight of $LiPO_2F_2$ and 0.5 parts by weight of vinylene carbonate |

TABLE 1-continued

| | Composition of positive active material | Composition of electrolyte additive (based on 100 parts by weight of the organic solvent) |
|---|---|---|
| Reference Example 2 | 40 wt % of $LiNi_{0.5}Co_{0.2}Mn_{0.3}O_2$ and 60 wt % of $LiMnO_2$ | 1 part by weight of $LiPO_2F_2$ and 0.5 parts by weight of vinylene carbonate |

Evaluation 1: Room Temperature Cycle-life Characteristics of Rechargeable Lithium Battery Cell The rechargeable lithium battery cells according to Examples 1 to 5, Comparative Examples 1 to 4 and Reference Examples 1 and 2 were each charged and discharged 300 times, and then 500 times, under a charge and discharge condition of 1C-rate at room temperature, and the capacity and resistance measurements are provided in the following Table 2 and Table 3.

Evaluation 2: Room Temperature Output Characteristics of Rechargeable Lithium Battery Cell The rechargeable lithium battery cells according to Examples 1 to 5, Comparative Examples 1 to 4 and Reference Examples 1 and 2 were each discharged 300 times, and then 500 times, for 10 seconds at room temperature with a reference to SOC (state of charge) of 50%, and the capacity and resistance measurements are provided in the following Table 2 and Table 3.

Evaluation 3: High Temperature Cycle-life Characteristics of Rechargeable Lithium Battery Cell The rechargeable lithium battery cells according to Examples 1 to 5, Comparative Examples 1 to 4 and Reference Examples 1 and 2 were each allowed to stand at 60° C. for 30 days, and then for 60 days, under a charge and discharge condition of 1C-rate, and the capacity and resistance measurements are provided in the following Tables 2 and 3.

Evaluation 4: High Temperature Output Characteristics of Rechargeable Lithium Battery Cell The rechargeable lithium battery cells according to Examples 1 to 5, Comparative Examples 1 to 4 and Reference Examples 1 and 2 were each allowed to stand at 60° C. for 30 days, and then for 60 days, under a 10 seconds discharge condition with a reference to SOC (state of charge) of 50%, and the capacity and resistance measurements are provided in the following Tables 2 and 3.

TABLE 2

| | Ratio of 300th cycle capacity relative to initial capacity (%) | Ratio of 300th cycle resistance relative to initial resistance (%) | Ratio of capacity after being allowed to stand at 60° C. for 30 days relative to initial capacity (%) | Ratio of resistance after being allowed to stand at 60° C. for 30 days relative to initial resistance (%) |
|---|---|---|---|---|
| Example 1 | 97.1 | 95.5 | 90.2 | 110 |
| Example 2 | 96.9 | 94.8 | 88.8 | 111 |
| Example 3 | 97.2 | 95.7 | 91.1 | 109 |
| Example 4 | 97.3 | 96.2 | 89 | 112 |
| Example 5 | 96.7 | 99.8 | 87.8 | 117 |
| Comparative Example 1 | 92.8 | 95.7 | 87.9 | 89 |
| Comparative Example 2 | 96.9 | 107.2 | 91 | 144 |
| Comparative Example 3 | 96.6 | 102.1 | 83.5 | 148 |
| Comparative Example 4 | 95.8 | 94.9 | 83.4 | 112 |
| Reference Example 1 | 95.3 | 97.2 | 84.3 | 108 |
| Reference Example 2 | 95.8 | 98.3 | 82.1 | 107 |

TABLE 3

| | Ratio of 500th cycle capacity relative to initial capacity (%) | Ratio of 500th cycle resistance relative to initial resistance (%) | Ratio of capacity after being allowed to stand at 60° C. for 60 days relative to initial capacity (%) | Ratio of resistance after being allowed to stand at 60° C. for 60 days relative to initial resistance (%) |
|---|---|---|---|---|
| Example 1 | 94.2 | 103.1 | 88.4 | 114 |
| Example 2 | 93.9 | 103.3 | 87.1 | 113 |
| Example 3 | 93.4 | 104.3 | 89.7 | 111 |
| Example 4 | 94.3 | 104.6 | 88.6 | 118 |
| Example 5 | 94.1 | 107 | 87.8 | 127 |
| Comparative Example 1 | 90.1 | 103.3 | 85.1 | 102 |
| Comparative Example 2 | 91.4 | 110.5 | 86.3 | 146 |
| Comparative Example 3 | 92.3 | 112.1 | 82.3 | 156 |
| Comparative Example 4 | 91.2 | 105.3 | 84.4 | 115 |
| Reference Example 1 | 90.8 | 108.2 | 80.2 | 113 |

TABLE 3-continued

|  | Ratio of 500th cycle capacity relative to initial capacity (%) | Ratio of 500th cycle resistance relative to initial resistance (%) | Ratio of capacity after being allowed to stand at 60° C. for 60 days relative to initial capacity (%) | Ratio of resistance after being allowed to stand at 60° C. for 60 days relative to initial resistance (%) |
|---|---|---|---|---|
| Reference Example 2 | 90.7 | 107.8 | 79.6 | 114 |

Referring to Tables 2 and 3, Examples 1 to 5 (in which the rechargeable lithium batteries included lithium difluorophosphate and vinylene carbonate in the electrolyte additive and the compound represented by Chemical Formula 1 in the positive electrode) showed better power and cycle-life characteristics at room temperature and at a high temperature, than the rechargeable lithium batteries of Comparative Examples 1 to 4 (which used either only one of the electrolyte additives, or mixtures of the two electrolyte additives, but in amounts outside of the ranges disclosed in the present embodiments).

While certain exemplary embodiments have been described, it is to be understood that the disclosure is not limited to the disclosed embodiments, but, on the contrary, is intended to cover various modifications and equivalent arrangements included within the spirit and scope of the appended claims and equivalents thereof.

What is claimed is:

1. A rechargeable lithium battery comprising
a positive electrode comprising a positive active material comprising a compound represented by Chemical Formula 1:

$$Li_aNi_xCo_yMn_zO_2,$$ Chemical Formula 1 wherein $0<a\leq 2$, $0.2\leq x\leq 0.6$, $0.2\leq y\leq 0.6$, $0.2<z\leq 0.6$, and $x+y+z=1$;
a negative electrode; and
an electrolyte including a lithium salt, an organic solvent and an additive, the additive comprising about 0.5 parts by weight to about 2 parts by weight of lithium difluorophosphate ($LiPO_2F_2$) based on 100 parts by weight of the organic solvent, and about 0.5 parts by weight to about 3 parts by weight of vinylene carbonate based on 100 parts by weight of the organic solvent, the vinylene carbonate and the lithium difluorophosphate being present in a weight ratio of about 1:2 to about 3:1.

2. The rechargeable lithium battery of claim 1, wherein the positive active material comprises about 80 wt % to about 99 wt % of the compound represented by Chemical Formula 1, and further comprises about 1 wt % to about 20 wt % of a compound represented by Chemical Formula 2:

$$LiMnO_2$$ Chemical Formula 2.

3. The rechargeable lithium battery of claim 1, wherein the lithium difluorophosphate is present in an amount of about 1 part by weight to about 1.5 parts by weight based on 100 parts by weight of the organic solvent.

4. The rechargeable lithium battery of claim 1, wherein the vinylene carbonate is present in an amount of about 0.5 parts by weight to about 1 part by weight based on 100 parts by weight of the organic solvent.

5. The rechargeable lithium battery of claim 1, wherein the lithium salt comprises $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein x and y are natural numbers, LiCl, LiI, $LiB(C_2O_4)_2$, or a combination thereof.

6. The rechargeable lithium battery of claim 1, wherein the organic solvent comprises ethylene carbonate, propylene carbonate, butylene carbonate, dimethyl carbonate, diethyl carbonate, dipropyl carbonate, methylpropyl carbonate, ethylpropyl carbonate, methylethyl carbonate, acetate, methylacetate, n-propylacetate, dimethylsulfoxide, acetonitrile, dimethoxyethane, diethoxyethane, sulfolane, gamma-butyrolactone, ethylene sulfite, propylene sulfite, tetrahydrofuran, methyl propionate, ethyl propionate, propyl propionate, decanolide, valerolactone, mevalonolactone, caprolactone, dibutylether, tetraglyme, diglyme, 2-methyltetrahydrofuran, cyclohexanone, ethanol, isopropyl alcohol, or a combination thereof.

7. The rechargeable lithium battery of claim 1, wherein the additive further comprises vinylethylene carbonate, fluoroethylene carbonate, or a combination thereof.

* * * * *

UNITED STATES PATENT AND TRADEMARK OFFICE
CERTIFICATE OF CORRECTION

PATENT NO. : 9,768,471 B2  
APPLICATION NO. : 14/630603  
DATED : September 19, 2017  
INVENTOR(S) : In-Hyun Lee et al.

Page 1 of 1

It is certified that error appears in the above-identified patent and that said Letters Patent is hereby corrected as shown below:

In the Claims

Column 12, Line 27,     Delete "$LiClO_4$, $LiAlO_2$, $LiAICl_4$,",  
Claim 5     Insert --$LiClO_4$, $LiAlO_2$, $LiAlCl_4$,--

Signed and Sealed this  
Sixteenth Day of April, 2019

Andrei Iancu  
*Director of the United States Patent and Trademark Office*